INVENTOR.
AUGUST R. HAYES

United States Patent Office 3,011,368
Patented Dec. 5, 1961

3,011,368
ROUGH AND FINISH BORING MACHINES
August R. Hayes, Rock Island, Ill., assignor to The Moline Tool Company, Moline, Ill., a corporation of Illinois
Filed Nov. 3, 1958, Ser. No. 771,324
2 Claims. (Cl. 77—4)

Cylinder bores and cylinder sleeves are rough bored at present on one boring machine, then moved to another boring machine, and there finish bored. Since the finish bore takes off a layer of material only about .007 inch thick, this involves the problem of successively clamping the work in two clamping devices, one in each boring machine, with such precision that the axis of the rough bored work piece is precisely in the axis of the boring bar of the finish boring machine. Considerable time is lost in raising the boring bar that made the rough cut out of the work, stopping the machine, unclamping the work piece, transferring the work piece to the other machine, and clamping it ready for the finish bore.

The invention avoids the chance of inaccurate clamping and the loss of time by performing both the rough boring and the finish boring operation on the same machine.

This may be accomplished by using a special cutter head carrying cutters set for the rough bore and, in addition, carrying a cutter set for the finish bore when moved into cutting position.

While the invention is applicable to machines with either vertical or horizontal spindles the invention will be illustrated as applied to a boring machine having a vertical spindle or boring bar. The work is clamped into place, the boring bar revolves and is fed downward one set of cutters making the rough bore while the finish bore cutter is out of contact with the work. This performs the rough cut. When the boring bar has completed the rough cut, the finish cutter is moved into cutting position without stopping the rotation of the boring spindle about its axis. The boring spindle, while revolving and gradually moving upward, completes the finish cut.

While the invention is illustrated as applied to a vertical boring machine with revolving spindle and stationary work it is obvious to those skilled in the art that the invention could be used with a boring bar that does not revolve while the work revolves about its axis: and also that the boring bar can be vertical or horizontal or at an angle as in boring V type engine blocks.

The object of the invention is to perform both a rough boring and a finish boring operation on the same machine with two sets of cutters, the rough cutters being operative while the boring bar is fed into the work piece, the finish cutter being operative while the boring bar is fed out of the work piece.

A further object of the invention is to provide a boring machine that can both rough and finish bore a sleeve or cylinder.

A further object of the invention is to provide a boring head set for rough boring with a tool holder movable normal to the axis of the boring bar by moving a control rod axially of the boring bar.

Another object is to provide a spindle and cutter head designed to make a rough cut in a work piece when the spindle moves in one direction and a finish cut when the direction of spindle feed is reversed and a finish cutter device automatically actuated to place the finish cutter in cutting position.

The invention resides in a special boring bar carrying a novel boring head having both rough bore cutters and a finish bore cutter. The finish bore cutter is movable in the boring head and can be moved into or out of cutting position by the axial movement of a rod extending through the length of the boring bar.

The invention resides in a special boring head that may be carried at the bottom of a conventional boring bar having actuating means for this boring head carried by a rod extending through the boring bar.

Figure 1:
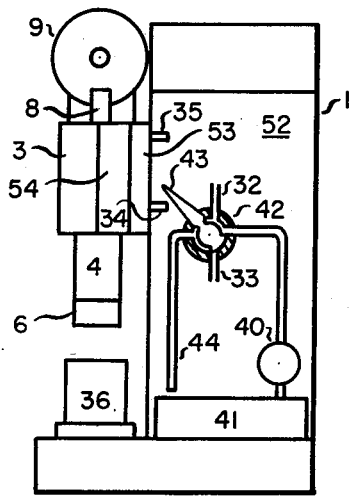
FIGURE 1 shows in elevation, diagrammatically, a typical boring machine modified to incorporate the invention.
Figure 4:
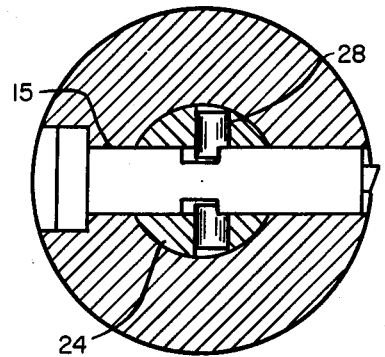
FIGURE 4 is a section taken along lines 4—4 in FIGURE 3.
Figure 2:
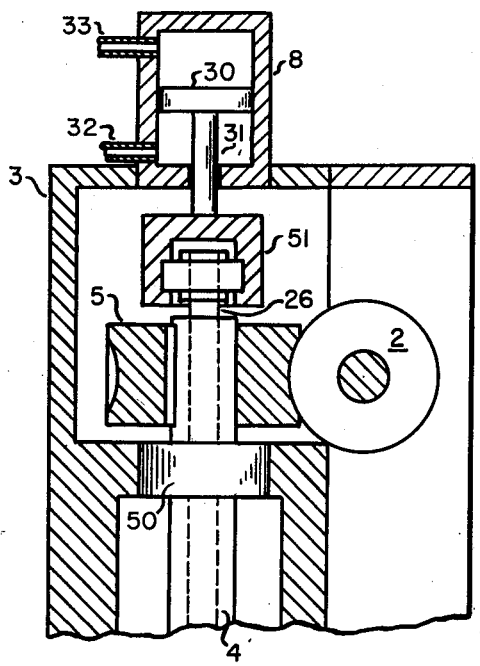
FIGURE 2 shows the spindle head of the boring machine shown in FIGURE 1 in vertical section drawn to a larger scale.

To understand the invention a portion of a conventional boring machine shown in FIGURE 1 is shown in section in FIGURE 2.

Boring machine 1 is illustrated as of the conventional type having a column 52 on which a slide 53 can be moved up or down. The slide carries a rail 54 that may support one or more spindle heads 3.

Spindle head 3 supports boring bar 4, such as by roller bearings 50. Drive gear 5 is keyed to the boring bar. Gear 5 meshes with drive shaft 2. This drive shaft may be driven by a motor 9 mounted on slide 53. It will be understood that the conventional boring machine parts thus far described are old and well known in the machine tool art.

The invention consists of a novel boring head generally indicated at 6, attached to the lower end of boring bar 4 and means to shift a cutter 7 in this boring head by means of a cylinder 8 carried by the spindle head 3.

The boring head carries fixed cutters 12 adjusted to rough-bore the sleeve being bored. At the upper end of the boring head 6 an extension 13 extends into a recess in the boring bar 4. A passage 15 of rectangular section extends through this head. This passage supports a bar 16 of rectangular section that carries the finish bore cutter 7. This cutter 7 can be adjusted longitudinally of bar 16 by a screw 17. After the adjustment has been made, set screws 18 lock the cutter 7 in the selected position. The bar 16 has a head 20 that bears against shoulder 21 when the cutter 7 is moved into cutting position.

The bar 16 has at least one inclined groove 22.

Figure 5:
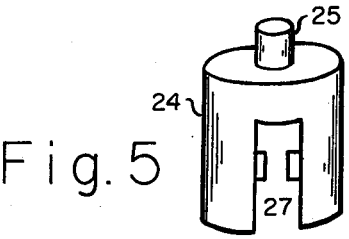
FIGURE 5 shows, in perspective, the vertically movable piece that moves the cutter making the finish cut into cutting position.

The boring head 6 has a central vertical bore 23 in which a vertical plunger 24, shown in FIGURE 5 in perspective, is located. This plunger slides freely in bore 23. At the upper end this plunger has an extension 25 that can be connected to a rod 26 that extends upward axially through the entire length of boring bar 4. The plunger 24 has a slot 27. Studs 28 are carried by plunger 24 and extend into slot 27. These studs extend into slot 22 in bar 16. If the plunger 24 is moved vertically upward in FIGURE 3 the bar 16 is moved in a direction that draws cutter 7 inward; if the plunger is moved downward, the cutter 7 is moved outward until head 20 bears against shoulder 21.

Cylinder 8 contains a piston 30 and the piston rod 31 is connected to rod 26 to move it up or down depending on whether fluid under pressure is fed through line 32 or 33. This connection may be made by a ball bearing coupling 51 that allows rod 26 to revolve while piston rod 31 moves only up and down.

The slide 53 may carry studs 34, 35 that are set so that when the slide beam is in its upper position with the boring head 6 out of the work piece 36 the cutter 7 is moved out of cutting position preparatory to the rough cut that will be made by the boring bar when the cross beam is moving down. When the cutter head has completed the rough cut, the slide beam may move the cutter 7 into cutting position preparatory to the rise of the cross beam.

This may be accomplished in a variety of ways. By way of illustration, a pump 40 may pump fluid out of sump 41. The valve 42 may be oscillated by an arm 43 that is contacted by studs 34 or 35. The valve 42 has passages that feed the fluid under pressure from pump to line 32 to hold the piston 30 in its upper position when the arm 43 is in the position shown. The line 33, connected to the space in the cylinder on the other side of the piston 30 leads the fluid back to the sump through line 44. The passages in the valve 42 are so arranged that when the arm 43 is depressed pump 40 will feed fluid under pressure into line 33, forcing rod 26 down to move cutter 7 out. To allow for the movement of slide 53 relative to the stationary column 52 carrying the pump, connecting lines 32, 33, may be flexible.

In the operation of the machine the work is clamped with its axis of the bore in line with the boring bar 4. The work and the boring bar then revolve relative to each other and the boring bar and the work piece are moved toward each other, such as by lowering spindle head 3. Meantime cutters 12 perform the rough cut while cutter 7 is inactive. At the completion of the down stroke of the slide the boring bar extends through the work piece.

Thus far the lever 43 has been in the position shown in FIGURE 1. As the slide 53 carries the spindle head 3 and the boring bar down through the work piece 36 until the boring head 6 projects below the work piece, stud 35 is slide 53 engages lever 43 and moves it to the other position and piston 30 is now forced down by fluid flowing through line 33 from pump 40. This pushes rod 26 down and also plunger 24. The studs 27 carried by the plunger bearing against the side of inclined groove 22 push the bar 16 to the right in FIGURE 3 until head 20 bears against shoulder 21.

Figure 3:
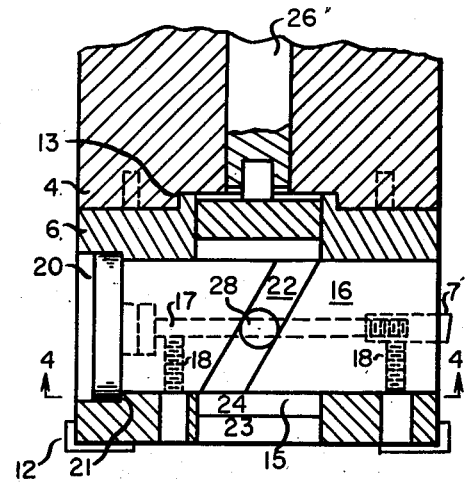
FIGURE 3 is a vertical section through the boring head carried by the lower end of the boring bar.

The cutters 12 were set for the rough cut; cutter 7 is set in bar 16 so that, when in the position shown in FIGURE 3 it projects beyond the position of cutters 12 just enough to perform the finish cut while the spindle head 3 and boring head 6 are moving upward. The slide 53 now moves slowly upward while boring bar 4 continues to revolve, always in the same direction, and the finish cut is performed.

The machine is then stopped and the finished work piece removed.

It will be understood that while in the embodiment of the invention used in the illustration the finish cutter is moved by hydraulic power in response to the actuation of a lever 43, any other method, manually mechanical or electric to move the rod 26 axially at the proper time might be substituted.

I claim:

1. A boring machine for making a rough bore on the forward stroke of the boring bar and a finish bore on the return stroke of the boring bar, having in combination, a frame supporting a work piece, a cross beam vertically movable on said frame, a vertical boring bar supported on said cross beam, means to rotate said boring bar in one direction, rough boring cutters carried by said boring bar, a radially movable finish cutter assembly carried by said boring bar, an axially movable rod in the axis of said boring bar, cooperating means between said axially movable rod and said finish cutter assembly to move a finish cutter carried by said finish cutter assembly radially into cutting position in response to the axial movement of said rod relative to the boring bar, a cylinder having a piston carried by the cross beam, a non-rotating piston rod attached to said piston, means between the piston rod and the axially movable rod permitting the non-rotating piston rod to move the rotating rod axially, adjustable studs carried by the cross beam actuating a device controlling the flow of fluid to the cylinder when the boring bar has completed the down stroke and the rough cut to project the finish cutter beyond the rough cut cutters in anticipation of the up stroke of the boring bar.

2. A boring a head adapted to be attached to the end of a boring bar having an axially movable rod comprising, a cylindrical head, an extension to align said head with the end of the boring bar, a radial hole in said head, a radially movable rectangular bar in said radial hole, a finish cutter carried by said radially movable bar, an axial hole of much larger diameter than the axially movable rod in said head, a vertical plunger movable in said axial hole, a slot in said plunger to allow the plunger to straddle said horizontal bar, inclined grooves on both sides of said rectangular bar, studs carried by said plunger engaging said grooves to project said finish cutter radially in response to axial movement of said plunger, a circular head on said rectangular bar limiting its outward radial movement by engaging a shoulder in a rectangular hole in said head, and means to adjust the cutter relative to said bar to assure that upon actuation of the plunger the finish bore will be of a preset diameter.

References Cited in the file of this patent

UNITED STATES PATENTS

| | | |
|---|---|---|
| 1,012,091 | Markland | Dec. 19, 1911 |
| 1,312,737 | Krueger | Aug. 12, 1919 |
| 2,247,283 | Young | June 24, 1941 |
| 2,270,590 | Johnson | Jan. 20, 1942 |
| 2,287,559 | Nye | June 23, 1942 |
| 2,590,068 | Pekrul | Mar. 18, 1952 |
| 2,661,639 | Clyde | Dec. 8, 1953 |
| 2,747,948 | Jergens | May 29, 1956 |

FOREIGN PATENTS

| | | |
|---|---|---|
| 609,356 | Germany | Feb. 13, 1935 |